(12) United States Patent
Traver

(10) Patent No.: US 7,122,258 B2
(45) Date of Patent: Oct. 17, 2006

(54) FUEL CELL AIR SYSTEM AND METHOD

(75) Inventor: Robert S. Traver, Ballston Lake, NY (US)

(73) Assignee: Plug Power Inc., Latham, NY (US)

( * ) Notice: Subject to any disclaimer, the term of this patent is extended or adjusted under 35 U.S.C. 154(b) by 326 days.

(21) Appl. No.: 10/264,539

(22) Filed: Oct. 4, 2002

(65) Prior Publication Data

US 2003/0096152 A1 May 22, 2003

Related U.S. Application Data

(60) Provisional application No. 60/336,508, filed on Oct. 31, 2001.

(51) Int. Cl.
*H01M 8/04* (2006.01)

(52) U.S. Cl. .......................... 429/13; 429/34

(58) Field of Classification Search ............... 429/12, 429/13, 34, 35, 36, 37, 38, 39; 55/315, 486
See application file for complete search history.

(56) References Cited

U.S. PATENT DOCUMENTS

| 4,650,506 A | * | 3/1987 | Barris et al. .................. 55/487 |
| 6,152,996 A | | 11/2000 | Linnersten et al. |
| 6,309,451 B1 | * | 10/2001 | Chen ........................... 96/134 |
| 6,432,177 B1 | | 8/2002 | Dallas et al. |
| 6,489,052 B1 | * | 12/2002 | Acker ........................ 429/40 |
| 6,638,339 B1 | * | 10/2003 | Dallas et al. ............. 429/13 X |
| 2002/0150805 A1 | | 10/2002 | Stenersen et al. |
| 2002/0150806 A1 | | 10/2002 | Stenersen et al. |
| 2002/0157359 A1 | | 10/2002 | Stenersen et al. |

* cited by examiner

*Primary Examiner*—Stephen J. Kalafut
(74) *Attorney, Agent, or Firm*—Trop, Pruner & Hu, P.C.

(57) ABSTRACT

The invention provides filtration systems and associated methods for filtering a fuel cell reactant stream of particulate and vapor contaminants. In one embodiment, the invention provides a reactant filtration system for a fuel cell, including a first filter having a first inlet and a first outlet, and a second filter having a second inlet and a second outlet. The first filter includes a textile particulate filter, and the second filter includes an activated carbon material. The first and second filters are coupled such that the first inlet is adapted to receive a flow of reactant, which is flowed through the first filter to the first outlet and then to the second inlet, through the second filter and then through the second outlet, which is coupled to an electrode chamber of a fuel cell.

23 Claims, 1 Drawing Sheet

FUEL CELL AIR SYSTEM AND METHOD

CROSS REFERENCE TO RELATED APPLICATIONS

This application claims priority under 35 USC 119(e) from U.S. Provisional Application No. 60/336,508, filed Oct. 31, 2001, naming Traver as inventor, and titled "FUEL CELL AIR SYSTEM AND METHOD." That application is incorporated herein by reference in its entirety and for all purposes.

BACKGROUND

The invention generally relates to a method and apparatus for filtering a fuel cell reactant stream of particulate and vapor contaminants.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

$$H_2 \rightarrow 2H^+ 2e^-$$

at the anode of the cell, and $$O_2 + 4H^+ + 4e^- \rightarrow 2H_2O$$

at the cathode of the cell.

A typical fuel cell has a terminal voltage of up to about one volt DC. For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow field channels and orifices to, as examples, route the reactants and products through the fuel cell stack. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow field channels and diffuse through the GDLs to reach the PEM. The PEM and its adjacent pair of catalyst layers are often referred to as a membrane electrode assembly (MEA). An MEA sandwiched by adjacent GDL layers is often referred to as a membrane electrode unit (MEU).

Suitable fuel cell components are well known in the art. As examples, common membrane materials include Nafion™, Gore Select™, sulphonated fluorocarbon polymers, and other materials such as polybenzimidazole and polyether ether ketone. Various suitable catalyst formulations are also known in the art, and are generally platinum-based. The GDL's generally comprise either a paper or cloth based on carbon fibers. The flow field plates are generally molded, stamped or machined from materials including carbon composites, plastics and metal alloys. The plates may include various surface flow channels and orifices to, as examples, route the reactants and products through the fuel cell stack. Reactant gases from each side of the PEM may pass along the flow channels and diffuse through the GDLs to reach the PEM.

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. Thus, a controller of the fuel cell system may monitor the output power of the stack and based on the monitored output power, estimate the fuel flow to satisfy the appropriate stoichiometric ratios. In this manner, the controller regulates the fuel processor to produce this flow, and in response to the controller detecting a change in the output power, the controller estimates a new rate of fuel flow and controls the fuel processor accordingly.

The fuel cell system may provide power to a load, such as a load that is formed from residential appliances and electrical devices that may be selectively turned on and off to vary the power that is demanded by the load. Thus, the load may not be constant, but rather the power that is consumed by the load may vary over time and abruptly change in steps. For example, if the fuel cell system provides power to a house, different appliances/electrical devices of the house may be turned on and off at different times to cause the load to vary in a stepwise fashion over time. Fuel cell systems adapted to accommodate variable loads are sometimes referred to as "load following" systems.

Fuel cells generally operate at temperatures much higher than ambient (e.g., 50–80° C. or 120–180° C.), and the fuel and air streams circulated through the fuel cells typically include water vapor. For example, reactants associated with sulphonated fluorocarbon polymer membranes must generally be humidified to ensure the membranes remain moist during operation. In such a system, water may condense out of a process stream where the stream is cooled below its dew point. For example, if the anode and cathode exhaust streams are saturated with water vapor at the stack operating temperature, water will tend to condense from these streams as they cool after leaving the stack. Similarly, the humidity and temperature conditions of other process streams may also produce condensation. It may be desirable to remove condensate from a process stream in a fuel cell system process stream. As examples, such condensate can interfere with the flow of process streams, can potentially build to levels that can flood portions of the system, and can also cause problems if allowed to freeze (e.g., in an outdoor unit that is not in service).

The term "integrated fuel cell system" (also commonly referred to simply as "fuel cell system") generally refers to a fuel cell stack that is coupled to components and subsystems that support the operation of the stack. For example, this could refer to a fuel cell stack that is connected to a power conditioning device that converts direct current from the fuel cell into alternating current similar to that available from the grid. It might also refer to a system equipped with a fuel processor to convert a hydrocarbon (e.g., natural gas, propane, methanol, etc.) into a hydrogen rich stream (e.g., reformate) for use in the fuel cell. An integrated fuel cell system may also include a control mechanism to automate at least some portion of the operation of the system. Integrated fuel cell systems may include a single controller common to the entire system, or may include multiple controllers specific to various parts of the system. Likewise, the operation of integrated fuel cell systems may be fully or partially automated. Also, an integrated fuel cell system may or may not be housed in a common enclosure.

In addition to PEM fuel cells, the invention discussed below may also be applied to other types of fuel cell systems where air is used as a reactant, including but not limited to solid oxide, phosphoric acid, molten carbonate systems.

There is a continuing need for integrated fuel cell systems and associated process methods designed to achieve objectives including the forgoing in a robust, cost-effective manner.

SUMMARY

The invention provides filtration systems and associated methods for filtering a fuel cell reactant stream of particulate and vapor contaminants. In one aspect, the invention provides a reactant filtration system for a fuel cell, including a first filter having a first inlet and a first outlet, and a second filter having a second inlet and a second outlet. The first filter includes a textile particulate filter, and the second filter includes an activated carbon material. The first and second filters are coupled such that the first inlet is adapted to receive a flow of reactant, which is flowed through the first filter to the first outlet and then to the second inlet, through the second filter and then through the second outlet, which is coupled to an electrode chamber of a fuel cell.

While both the air and fuel reactants of a fuel cell system can be filtered with systems described herein, generally only the cathode feed stream needs to be filtered. In a preferred embodiment, the first filter includes a mesh of hydrophobic, polypropylene fibers. Commercially available polypropylene filtration meshes can be used that are configured to remove a desired percentage of particles down to a given size (e.g., 99% of particles larger than 0.3 microns, or 10 microns, as examples).

In a preferred embodiment, the second filter is a porous block of extruded activated carbon. A carbon sediment filter can also be used, but the porous block configuration is preferred because sediment filters tend to release carbon dust that can potentially impact a fuel cell's performance over time. The second filter is also preferably configured to remove any sulfur dioxide (SO2) in the reactant stream to less than 0.25 parts per million, any nitrogen dioxide (NO2) in the reactant stream to less than 0.53 parts per million, and any hydrogen sulfide (H2S) in the reactant stream to less than 0.20 parts per million. N-pentane is commonly used as an indicator of effectiveness of a filter against organic vapors. The second filter of the present invention is preferably selected to provide filtration of n-pentane (e.g., as a effectiveness test stream injected into the reactant stream) to less than 0.03 parts per million.

In another preferred aspect, the second filter is an extruded block of activated carbon forming a hollow cylinder, wherein the second inlet and the second outlet are coupled radially through the cylinder wall. With this arrangement, the thickness of the cylinder can be selected to provide a desired filtration path. In some embodiments, a housing is provided that contains the first and second filters. The housing has a third inlet and a third outlet. The first filter encloses the cylinder wall of the second filter, and the housing encloses the first filter such that a flow is directed from the third inlet through the first filter, then through the cylinder wall of the second filter to the hollow portion of the cylinder, then through the third outlet.

In another aspect, the invention provides an air filtration system for a fuel cell that has a first filter stage including a textile particulate filter, and a second filter stage including an activated carbon material. The textile particulate filter includes a hydrophobic material, and the second filter stage is coupled to the first filter stage and adapted to receive a flow of air from the first filter stage.

In another aspect, the invention provides a method of operating a fuel cell, including the following steps: (1) flowing air through a textile particulate filter to form a first filtered flow; (2) flowing the first filtered flow through an activated carbon filter to form a second filtered flow; and (3) flowing the second filtered flow through a cathode chamber of a fuel cell. As previously discussed, the first filter can include hydrophobic fibers such as polypropylene fibers, and the second filter is preferably an extruded porous carbon block.

In some embodiments, the step of flowing air through a textile particulate filter includes removing at least 99% of particles in the air larger than 10 microns. The step of flowing the first filtered flow through an activated carbon filter can also include removing SO2, NO2, H2S or n-pentane to the specifications previously discussed.

In another aspect, the invention provides a method of operating a fuel cell, including the following steps: (1) flowing air through a textile particulate filter to form a first filtered flow, wherein the textile particulate filter includes hydrophobic fibers; (2) flowing the first filtered flow through an activated carbon filter to form a second filtered flow, wherein the activated carbon filter is a porous block; and (3) flowing the second filtered flow through an electrode chamber of a fuel cell.

Additional embodiments of the invention can also include any of the other features described herein, either alone or in combination. Advantages and other features of the invention will become apparent from the following description, drawings and claims.

DETAILED DESCRIPTION

Figure 1:
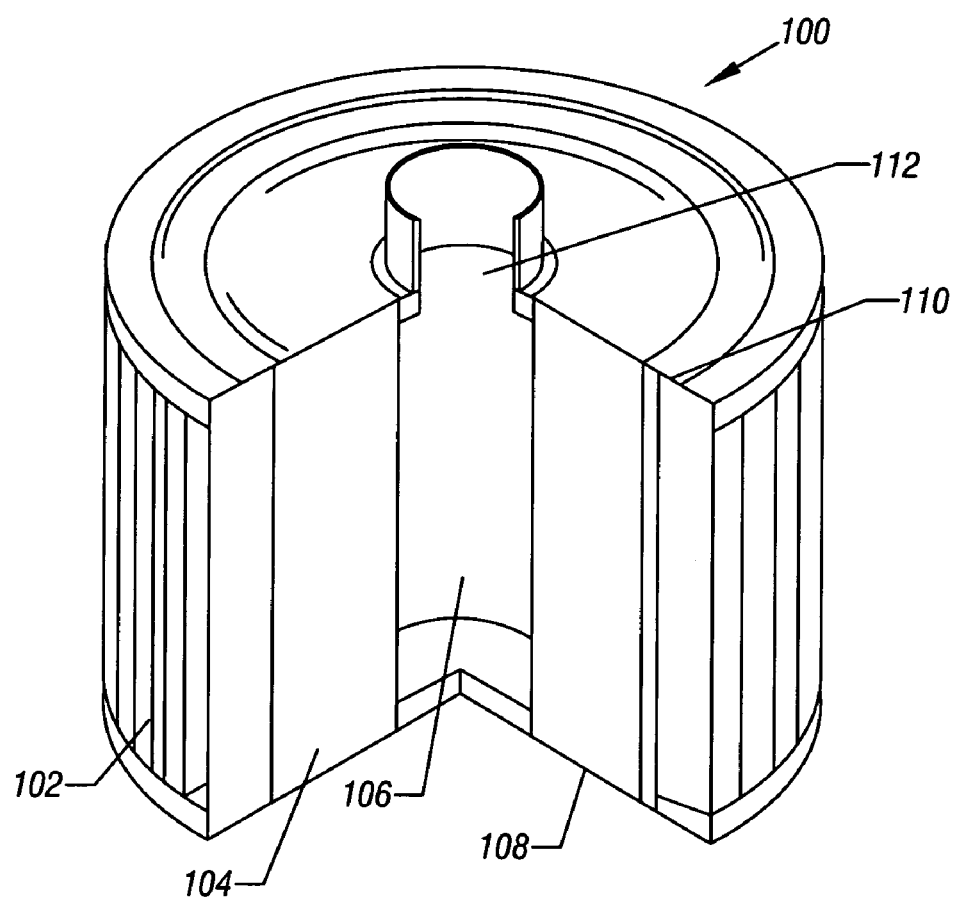
FIG. 1 shows a cutaway view of a fuel cell air filtration system.

Depending on factors including the particular materials used in or associated with a fuel cell, such as the membrane, catalyst, GDL and plate materials, fuel cells can be susceptible to contamination and degradation from unwanted materials in reactant streams. For example, particulate matter in the reactant gas streams may progressively limit the ability of gas to diffuse through a GDL layer to the fuel cell catalyst layer, and may also lower the number of catalyst sites available for reaction, thereby degrading fuel cell performance. Some types of particles, such as metal particles, may contaminate electrodes by bonding to catalyst sites. Similarly, volatile organic compounds (VOC's) and other vapors can harm a fuel cell by accumulating or by reacting in some way with the MEA.

Research into the design and operation of air-fed fuel cell systems has led to various discoveries relating to the effects of air quality on the performance and longevity of fuel cells. The present invention provides a state of the art gas delivery system for fuel cell systems based on such discoveries, wherein the components are specially selected to accommodate air-fed fuel cell systems. As an example, one such discovery has been the extreme susceptibility of sulphonated fluorocarbon polymer PEM fuel cells to contamination from metal particles, such as dust including iron or aluminum particles. Another discovery has been that many volatile organic compounds can degrade a fuel cell catalyst if they are present in the air stream fed to a fuel cell, even if present in relatively low concentrations (e.g., on the order of 100 parts per million), despite the presence of the platinum catalyst on the fuel cell electrode which might ordinarily serve to oxidize such compounds into harmless $CO_2$ and $H_2O$.

Thus, in one embodiment, a method is provided for purifying fuel cell reactant air, including at least the following steps: (1) flowing air through a textile particulate filter to form a first filtered flow; (2) flowing the first filtered flow through an activated carbon filter to form a second filtered flow; and (3) flowing the second filtered flow through a cathode chamber of a fuel cell. The particulate filter removes airborne particles, and the carbon filter removes organic vapors and other unwanted gasses. While the particulate filtration step is performed upstream from the carbon filtration step in this example, these steps can be performed in any order. They can also be performed within a common filter housing, or at different locations along the air intake path through the fuel cell system.

The particulate filter is preferably a non-woven textile high efficiency particulate air (HEPA) filter, capable of removing 99% of particles larger than 0.3 microns. Woven fiber filters may also be used, as well as particulate filters with other effective filtration ranges (e.g., 99% of particles larger than 10 microns), depending on factors including the environment where the fuel cell system will operate and draw air (e.g., indoor or outdoor installations).

The activated carbon filter is preferably an extruded porous block (e.g., 6×16 mesh core available from KX Industries). Use of a unitary porous block filter is important because it has been discovered that activated carbon sediment filters can produce dusts that can interfere with fuel cell performance. The pore size and other attributes of the activated carbon block filter may be tailored according to factors including desired pressure drop, lifetime, and target materials to be filtered. The thickness of the block may also be selected to provide a desired residence time or filtration path for the air to be filtered. For example, in a current design it is preferable to provide a hollow cylinder carbon block filter having a length of 6 inches and an outer diameter of about 6 inches with 2 inch thick walls, to accommodate an air flow of up to about 35 standard cubic feet per minute at temperatures up to 70° C. While the above specifications describe a radial flow filter, an axial flow arrangement may also be used, such as a non-hollow block through which air is passed from one end to the other.

While the above configuration of filtration components may be adequate for most applications, it was discovered that in some environments, various contaminants could nevertheless pass through such arrangements being dissolved in or otherwise associated with water vapor in the air being filtered. For example, in operating environments near coastal areas, humid air may contain salt that can pass through such arrangements and progressively deposit within a fuel cell, thereby degrading performance. It has been discovered that such problems can be alleviated by using hydrophobic fibers in the particulate filter. For example, a polypropylene mesh is currently preferred, such as the Electrostat E250 product available from Enhanced Filter Company of Ventura, Calif.

Referring to FIG. 1, a cutaway view of a fuel cell air purification filter 100 is shown. A textile particulate filter 102 is in fluid communication with a unitary porous activated carbon filter 104, which in turn is in fluid communication with a fuel cell air intake 106. The particulate filter 102 and the carbon filter 104 are supported by a first plate 108, and a second plate 110. The second plate includes an outlet orifice 112. The particulate filter 102 encloses the carbon filter 104. A blower (not shown) draws air through the filter 100. Air is drawn first through the particulate filter 102, and then flows through the carbon filter 104 and into the air intake 106 (the term "air intake" collectively describes the air delivery plumbing in the fuel cell system). The air flows out of the filter 100 through outlet orifice 112 and is then supplied to an air electrode of a fuel cell system (not shown).

In this particular embodiment, the carbon block filter is designed to remove n-pentane vapor to less than 0.03 PPM. It will be appreciated that n-pentane is commonly used as a reference material for filtration of organic vapors. The filter is intended to remove other gas components as well. For example, the above described filter system is intended for a fuel cell utilizing a sulphonated fluorocarbon PEM membrane operating at about 65° C. It was discovered that in such systems, certain common air components should be filtered to below certain levels to avoid degradation of fuel cell performance: n-pentane (as a reference) to less than 0.03 PPM; $SO_2$ to less than 0.25 PPM; $NO_2$ to less than 0.53 PPM; and $H_2S$ to less than 0.2 PPM.

While the invention has been disclosed with respect to a limited number of embodiments, those skilled in the art, having the benefit of this disclosure, will appreciate numerous modifications and variations therefrom. It is intended that the invention covers all such modifications and variations as fall within the true spirit and scope of the invention.

What is claimed is:

1. A system, comprising:
   a first filter having a first inlet and a first outlet, and a second filter having a second inlet and a second outlet;
   a fuel cell comprising an electrode chamber;
   wherein the first filter includes a textile particulate filter, and wherein the second filter includes an activated carbon material; and
   wherein the first inlet is adapted to receive a flow of reactant, wherein the first outlet is coupled to the second inlet, and wherein the second outlet is coupled to an electrode chamber of the fuel cell, and wherein the first filter includes a mesh of polypropylene fibers.

2. The system of claim 1, wherein the reactant is air and the electrode chamber is a cathode chamber of a PEM fuel cell having an operating temperature less than 80° C.

3. The system of claim 1, wherein the first filter includes a mesh of hydrophobic fibers.

4. The system of claim 1, wherein the first filter is effective to remove 99% of particles larger than 0.3 microns.

5. The system of claim 1, wherein the first filter is effective to remove 99% of particles larger than 10 microns.

6. The system of claim 1, wherein the second filter comprises a porous block.

7. The system of claim 1, wherein the second filter is effective to remove a flow of n-pentane to less than 0.03 parts per million.

8. The system of claim 1, wherein the second filter is effective to remove a flow of $SO_2$ to less than 0.25 parts per million.

9. The system of claim 1, wherein the second filter is effective to remove a flow of $NO_2$ to less than 0.53 parts per million.

10. The system of claim 1, wherein the second filter is effective to remove a flow of H2S to less than 0.20 parts per million.

11. The system of claim 1, wherein the second filter comprises an extruded block of activated carbon forming a hollow cylinder, wherein the second inlet and the second outlet are coupled radially through the cylinder wall.

12. The system of claim 11, further comprising a housing containing the first and second filters, wherein the housing has a third inlet and a third outlet, wherein the first filter encloses the cylinder wall of the second filter, wherein the housing encloses the first filter such that a flow is directed from the third inlet through the first filter, then through the cylinder wall of the second filter to the hollow portion of the cylinder, then through the third outlet.

13. A method, comprising:
providing a cylindrical textile particulate filter;
providing a cylindrical activated carbon filter;
disposing the activated carbon filter such that the particulate filter is generally concentric with the activated carbon filter and at least partially surrounds the activated carbon filter;
flowing air through a cylindrical wall of the particulate filter to form a first filtered flow;
flowing the first filtered flow through a cylindrical wall of the activated carbon filter to form a second filtered flow; and
flowing the second filtered flow into a cathode chamber of a fuel cell.

14. The method of claim 13, wherein the act of flowing air through the particulate filter includes removing at least 99% of particles in the air larger than 10 microns.

15. The method of claim 13, wherein the act of flowing the first filtered flow through the activated carbon filter includes removing SO2 in the air to less than 0.25 parts per million.

16. The method of claim 13, wherein the act of flowing the first filtered flow through the activated carbon filter includes removing NO2 in the air to less than 0.53 parts per million.

17. The method of claim 13, wherein the act of flowing the first filtered flow through the activated carbon filter includes removing H2S in the air to less than 0.20 parts per million.

18. The method of claim 13, wherein the particulate filter includes hydrophobic fibers.

19. The method of claim 13, wherein the activated carbon filter comprises a porous block.

20. A method of filtering a fuel cell reactant stream, comprising:
flowing air through a textile particulate filter to form a first filtered flow, wherein the textile particulate filter includes hydrophobic fibers and the act of flowing air through the textile particular filter comprises flowing the air through a mesh of polypropylene fibers;
flowing the first filtered flow through an activated carbon filter to form a second filtered flow, wherein the activated carbon filter is a porous block; and
flowing the second filtered flow through an electrode chamber of a fuel cell.

21. A system, comprising:
a fuel cell comprising an electrode chamber;
a first filter having a first inlet to receive a reactant flow and a first outlet;
a second filter comprising an activated carbon material and forming a hollow cylinder, the second filter comprising having a second inlet and a second outlet connected to the electrode chamber; and
wherein the first outlet is coupled to the second inlet, the second outlet is coupled to an electrode chamber of the fuel cell; and the second inlet and the second outlet are coupled radially through the cylinder wall.

22. The system of claim 21, further comprising:
a housing containing the first and second filters, wherein the housing has a third inlet and a third outlet, wherein the first filter encloses the cylinder wall of the second filter, wherein the housing encloses the first filter such that a flow is directed from the third inlet through the first filter, then through the cylinder wall of the second filter to the hollow portion of the cylinder, then through the third outlet.

23. The system of claim 21, wherein the first filter comprises a mesh of polypropylene fibers.

* * * * *